United States Patent [19]

M'Sadoques et al.

[11] Patent Number: 4,724,513

[45] Date of Patent: Feb. 9, 1988

[54] METHOD OF RETAINING MOLDED CASE CIRCUIT BREAKERS

[75] Inventors: Andre J. M'Sadoques; Robert J. Sabatella, both of Southington, Conn.

[73] Assignee: General Electric Company, New York, N.Y.

[21] Appl. No.: 28,366

[22] Filed: Mar. 20, 1987

Related U.S. Application Data

[62] Division of Ser. No. 767,315, Aug. 19, 1985, Pat. No. 4,670,963.

[51] Int. Cl.⁴ .............................................. H02B 1/20
[52] U.S. Cl. .................. 361/363; 361/361; 361/353; 200/295
[58] Field of Search ................. 361/351–353, 361/363, 361, 376; 200/293, 294, 295; 24/515, 518, 522

[56] References Cited

U.S. PATENT DOCUMENTS 3,065,386  11/1962  King et al. ........................ 361/363

Primary Examiner—E. A. Goldberg
Assistant Examiner—Lincoln Donovan
Attorney, Agent, or Firm—Richard A. Menelly; Walter C. Bernkopf; Fred Jacob

[57] ABSTRACT

Molded case circuit breakers having rear mounted line connectors are provided with retainer clips and plates to prevent easy removal of the breakers from electric panel box load stab connectors. The breakers can be removed for replacement however, without disassembling the entire electrical panel box.

2 Claims, 10 Drawing Figures

METHOD OF RETAINING MOLDED CASE CIRCUIT BREAKERS

This is a division of application Ser. No. 767,315 filed Aug. 19, 1985, U.S. Pat. No. 4,670,963.

BACKGROUND OF THE INVENTION

Recent safety considerations require that molded case circuit breakers having rear mounted line terminal connections be prevented from removal from an electrical panel box by the application of an ordinary pulling force. When the breaker switch is in the open position, and the line terminals are connected to the breaker, the energized breaker contacts can become a source of potential harm to an operator when the breaker is disengaged from the panel. An early attempt to prevent removal of a circuit breaker from a panel board is described in U.S. Pat. No. 3,111,354, H. J. Hammerly et al, wherein a U-shaped locking member is employed to retain the breaker within the panel against manually exerted removal force. In order to remove the breaker from the panel, a specially designed removing tool must be employed. U.S. Pat. No. 3,093,773, T. M. Cole, discloses a spring clip arrangement wherein the spring clip is attached to a circuit protective device for interlocking engagement with the panel box pan hook. To remove the device from the panel board, the panel board must be disassembled in order to provide access to the clip for disengaging the clip from the pan hook.

The purpose of this invention is to describe means for retaining a circuit breaker within a panel board against the ordinary manual forces applied to remove the breaker from the panel board. The circuit breaker can be removed by the application of an ordinary tool, such as a screwdriver, for example.

SUMMARY OF THE INVENTION

Circuit breaker retention means are provided for preventing the removal of molded case circuit breakers from circuit breaker panel boxes upon the exertion of ordinary manual force. One means includes the use of a retainer plate which is removably connected to the panel box after circuit breaker installation. The retaining plate must be removed from the panel box before the circuit breaker can be removed. Another means for retaining a circuit breaker within a penel box comprises a retainer clip mounted on the interior portion of the panel box. The circuit breaker is slidingly inserted within the clip and is retained by means of formed edges which contact the front surface of the breaker. The insertion of a screwdriver tip between the edges of the clip and the circuit breaker allows the circuit breaker to be removed from the panel box. A further means for retaining a circuit breaker within a panel box comprises a spring clip attached to the forward surface of a backfed main circuit breaker. Upon insertion within the panel box mounting pan, an angled back surface of the clip engages the hook-shaped extension of the mounting pan. To remove the breaker, the tip of the screwdriver is inserted between the angled portion of the spring clip and the mounting pan, and the spring clip is forced away from the hook to allow the clip to clear the mounting pan.

DESCRIPTION OF THE PREFERRED EMBODIMENT

Figure 2:
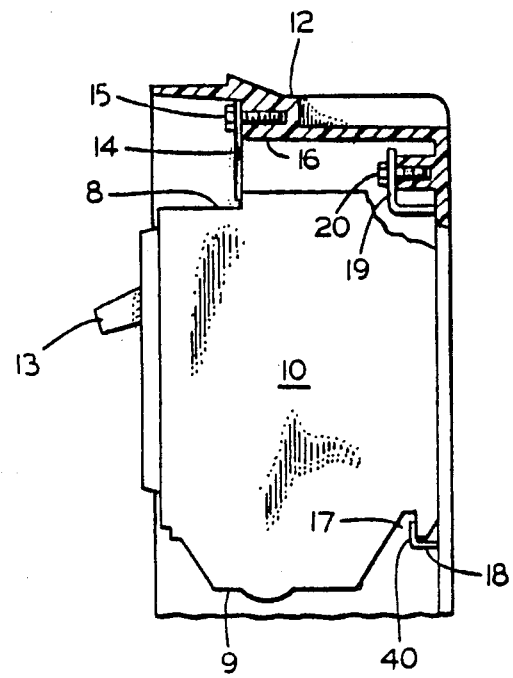
FIG. 2 is a side view, in partial section, of the breaker depicted in FIG. 1.
Figure 3:
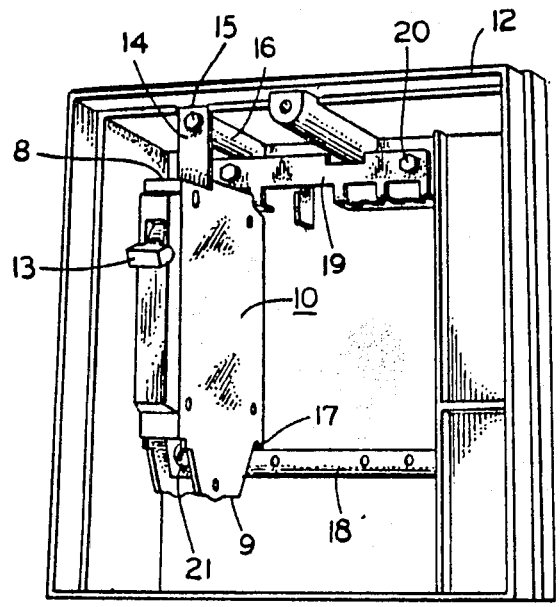
FIG. 3 is a front perspective view of the breaker depicted in FIGS. 1 and 2.

A residential type molded case circuit breaker 10 having a molded case 11 formed from a plastic material and containing an operating handle 13 is retained within a panel box housing sidewall 12 (hereafter "sidewall") by means of a retainer plate 14 and screw 15. Once the breaker is inserted within the panel box and retainer plate 14 is attached, breaker 10 cannot be removed by ordinary manual force. A tool such as a screwdriver or wrench, depending upon the configuration of screw 15 must be employed to remove the screw from sidewall 12 and to disengage retainer plate 14 from the front surface of breaker 10. FIG. 2 shows breaker 10 attached to sidewall 12 after mating recess 17, formed on breaker 10, with hook 18 on sidewall 12 and pivoting breaker 10 such that the front and rear breaker surfaces 8, 9 are parallel with sidewall 12. Hook 18 can be integrally formed as part of mounting pan 41 or can be separately attached as shown. The panel box plate 19, which is attached to sidewall 12 by means of screw 20, is opposite from hook 18 which is subjacent to installed breaker 10. Retainer plate screw 15 threadedly engages a boss 16 formed within sidewall 12 to secure retainer plate 14 against breaker front surface 8. The mounting arrangement of circuit breaker 10 within sidewall 12 is shown in FIG. 3 with breaker recess 17 engaging hook 18 proximate the breaker rear surface 9. As described earlier, the line connection is made with breaker 10 proximate the rear surface by connection with line terminal connector screw 21. The line connection at the rear surface is termed "back-fed main".

Figure 4:
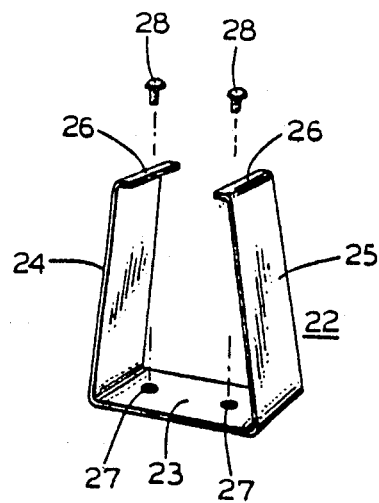
FIG. 4 is a front perspective view of a retainer clip according to the instant invention.
Figure 5:
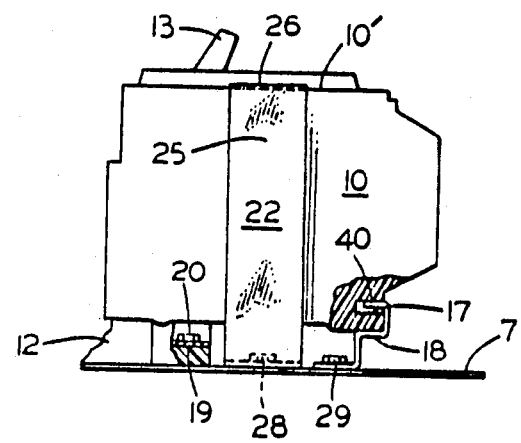
FIG. 5 is a side view of a circuit breaker retained on an electrical service panel box assembly within the retainer clip shown on FIG. 4.
Figure 6:
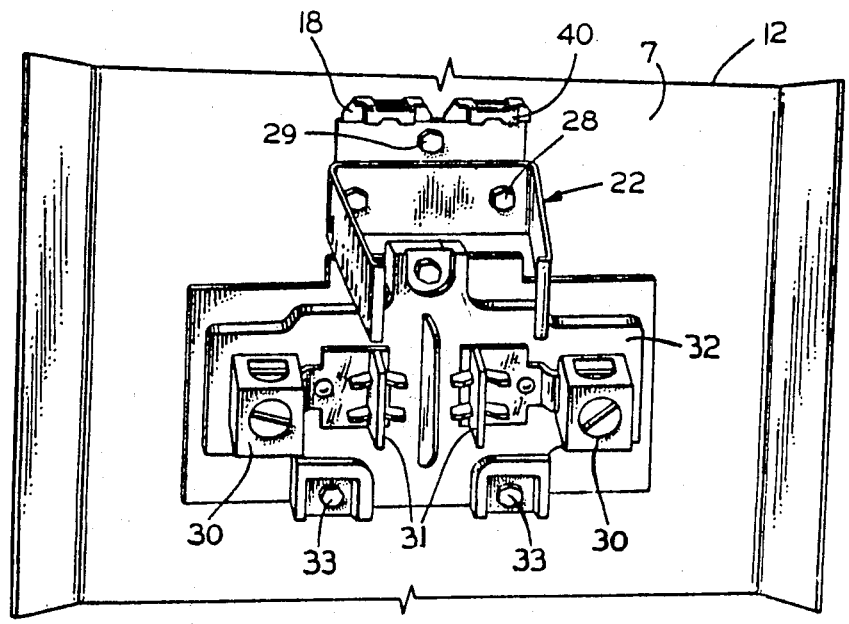
FIG. 6 is a front perspective view of the retainer clip depicted in FIG. 4.

Another method for retaining back-fed main circuit breakers within panel box enclosures is shown in FIGS. 4-6. A retainer clip 22 having a one piece construction consisting of a flat base or bight 23 and a pair of upstanding sidearms 24, 25 is employed. Sidearms 24, 25 toe in toward each other at the ends opposite the base and are held apart to admit the breaker. When this breaker is inserted within retainer clip 22 and the sidearms are returned to their rest position, a pair of formed edges 26 at the extremes of sidearms 24, 25 abut and grip the top surface of the breaker in a press fit relation and retain the breaker within clip 22 since the separation distance of sidearms 24, 25 is less than the length of bight 23. Clip 22 is held to the bottom on base 7 on sidewall 12 by means of a pair of screws 28 inserted through screwholes 27 in base 23. A breaker 10 within clip 22 is shown in FIG. 5 with formed edges 26 overlaying a portion of breaker 10 proximate handle 13. Breaker 10 is inserted within clip 22 by separating sidearms 24, 25 and mating breaker recess 17 with hook 18 and pivoting the breaker to bring the end of the breaker opposite recess 17 into close proximity with panel base 19 held to panel box bottom 7 by means of screw 20. Once breaker 10 is completely inserted within clip 22, sidearms 24, 25 are released in order for the formed edges 26 of the ends of sidearms 24, 25 to come in contact with the top surface 10′ of breaker 10. FIG. 6 shows the interior of a panel box compartment having panel stab base 19 attached to panel box bottom 7 by means of screws 33 and supporting a pair of wire connectors 30 and load contact stabs 31. When circuit breaker 10 is inserted within the panel box enclosure, complimentary load stab receivers as generally shown at 34 (FIG. 7) on the bottom surface of the breaker mate with load contact stabs 31 as shown in FIG. 6 to provide power to wire connector 30. Retainer clip 22 is mounted to panel box bottom 7 by means of screws 28 proximate hook 18 which includes a hook-shaped extension 40 for fitting within circuit breaker recess 17 as shown in FIG. 5.

Figure 1:
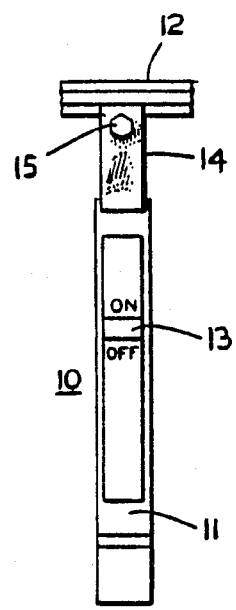
FIG. 1 is a front view of a residential type molded case circuit breaker including the retainer plate according to the invention.
Figure 7:
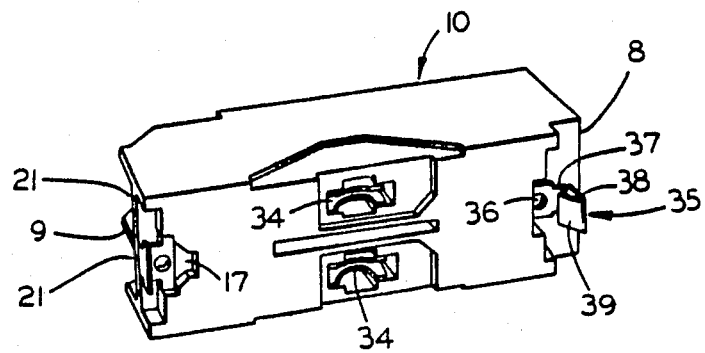
FIG. 7 is a bottom perspective view of a circuit breaker containing a spring clip retainer on the bottom surface.
Figure 8:
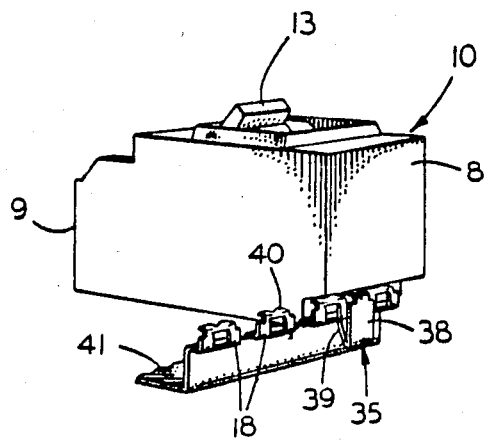
FIG. 8 is a side perspective view of the circuit breaker shown in FIG. 7 mounted on a panel mounting pan.
Figure 9:
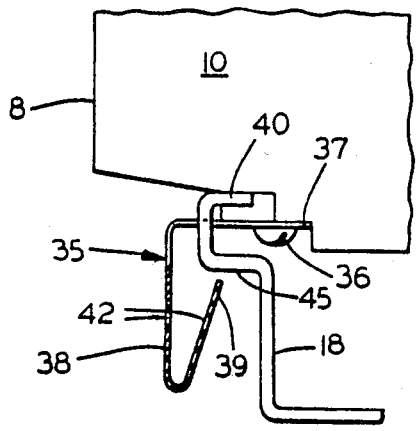
FIG. 9 is an enlarged side view of a portion of a circuit breaker containing an alternate embodiment of the spring clip retainer depicted in FIGS. 7 and 8.
Figure 10:
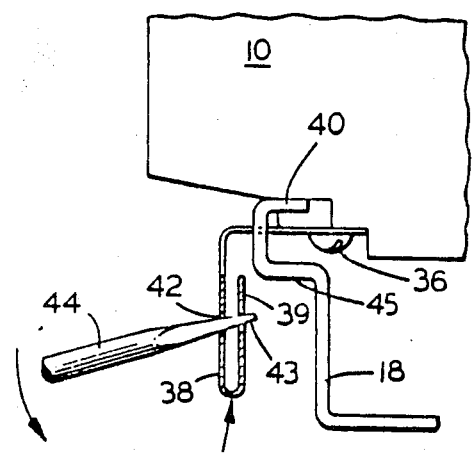
FIG. 10 is an enlarged side view of the spring clip retainer shown in FIG. 9.

FIG. 7 contains breaker 10 which is also of the back-fed main design and contains a mounting foot or extension 21 on the rear surface 9. A pair of load stab receivers 34 are recessed within the bottom of circuit breaker 10 for mating with a corresponding pair of load contact stabs 31 as shown earlier in FIG. 6. Proximate the breaker front surface 8 a spring clip retainer 35 is attached to the bottom of circuit breaker 10 by means of a screw 36. Spring clip retainer 35 contains a flat top portion 37 through which screw 36 is inserted, a flat forward surface 38 and a V-shaped extending rear surface 39. As shown in FIG. 8, with circuit breaker 10 mounted on mounting pan 41, spring clip retainer 35 associates with extension 40 or hook 18 in such a manner that forward surface 38 nests in front of extension 40 and the spring clip retainer rear surface 39 contacts the bottom of extension 40 to prevent breaker 10 from being removed from mounting pan 41. When breaker 10 is connected with mounting pan 41, spring clip retainer 35 contacts the top surface of extension 40 causing the spring clip retainer rear surface 39 to compress against front surface 38 allowing spring clip retainer 35 to clear the extension. Once rear surface 39 is beneath extension 40, rear surface 39 expands away from front surface 38 and assumes the position under extension 40 shown in FIG. 8. This differs from the embodiments depicted in FIGS. 1–3 and 4–6 respectively. The earlier embodiments can be removed by removing retaining screw 15 for those depicted in FIGS. 1–3, and by moving sidearms 24, 25 apart so that the formed edges 26 no longer contact top breaker surface 10′ for those shown in FIGS. 4–6. For the embodiment depicted in FIGS. 7, 8, the extension of spring clip retainer rear surface 39 beneath extension 40 essentially locks the breaker to the mounting pan. In order to be able to replace breaker 10, in the event of damage or failure, a tool such as the end of a screwdriver, must be inserted between mounting pan 41 and the spring clip retainer rear surface 39 in order to move the rear surface away from under the extension. An alternate embodiment of spring clip retainer 35 is shown in FIG. 9, wherein spring clip retainer 35 is attached to back surface 9 of circuit breaker 10 by means of screw 36 through flat top portion 37 and further includes a pair of access holes 42 to facilitate removal of spring clip rear surface 39 from under the bend 45 provided in extension 40. FIG. 10 shows the insertion of the tip 43 of a screwdriver 44 within the aligned access holes 42 formed within both forward surface 38 and rear surface 39. Pushing the handle of a screwdriver 44 in the direction indicated forces back surface 39 to come out from under bend 45 of extension 40 allowing spring clip retainer 35 to clear extension 40 and to allow the circuit breaker to be removed from the mounting pan.

In some applications, mounting foot 21 of FIG. 7, can be interchanged with spring clip retainer 35 on a back-fed main breaker. This arrangement also functions to firmly hold breaker 10 since the mounting pan hooks 40 of FIG. 8 are on both sides of mounting pan 41.

It will thus be seen that the objects set forth above, among those made apparent in the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described our invention what we claim as new and desire to secure by Letters Patent is:

1. A back-fed main circuit breaker having means for retaining the circuit breaker within an electrical panel box comprising:

molded case enclosure for housing circuit breaking means;

receiver means in a bottom portion of said molded case for mating with electrical contact means within an electrical panel box;

terminal connection means at a back end of said molded case electrically connecting with said circuit breaker means and arranged for receiving an external electrical conductor; and a spring clip retainer fastened to a forward portion of said molded case for engaging a mounting pan within said electrical panel box said spring clip retainer comprising a flat portion, a forward surface extending at a right angle from said flat portion, a rear surface extending from one end of said forward surface in a V-shaped configuration and access means extending through said forward surface for releasing said rear surface from hook means on said mounting pan.

2. The circuit breaker of claim 1 wherein said access means define an opening extending through said spring clip retainer surface and said spring clip retainer rear surface for accepting said removal tool, whereby the engagement of both said forward surface and said rear surface by said tool moves said rear surface toward said forward surface to remove said rear surface from engagement with said mounting pan hook means.

* * * * *